United States Patent

[11] 3,570,622

| [72] | Inventor | Daniel A. Wisner<br>North Adams, Mich. |
|---|---|---|
| [21] | Appl. No. | 787,348 |
| [22] | Filed | Dec. 27, 1968 |
| [45] | Patented | Mar. 16, 1971 |
| [73] | Assignee | RCA Corporation |

[54] SPEED CONTROL FOR MOTOR VEHICLES
4 Claims, 1 Drawing Fig.

| [52] | U.S. Cl. | 180/105, 123/102, 317/5, 180/109 |
|---|---|---|
| [51] | Int. Cl. | B60k 31/00 |
| [50] | Field of Search | 180/105- −109; 317/5; 123/102; 235/92; 340/147; 318/311, 312 |

[56] References Cited
UNITED STATES PATENTS

| 3,165,171 | 1/1965 | Baeriswyl | (235/92UX) |
| 3,206,665 | 9/1965 | Burlingham | 318/312 |
| 3,207,255 | 9/1965 | Hahlganss et al. | 317/5 |
| 3,289,783 | 12/1966 | Buhler | 180/106X |
| 3,319,733 | 5/1967 | Rath et al. | 180/106 |
| 3,332,406 | 7/1967 | Perry et al. | (180/105UX) |
| 3,340,951 | 9/1967 | Vitt | 180/106 |
| 3,409,102 | 11/1968 | Neapolitakis et al. | 317/5 |
| 3,485,316 | 12/1969 | Slavin et al. | 180/105 |

*Primary Examiner*—Kenneth H. Betts
*Attorney*—Edward J. Norton

ABSTRACT: A speed control apparatus for an automotive vehicle is disclosed. While the speed control includes mechanical actuated means to operate the throttle, electronic elements are provided to sense the speed of the vehicle and to store the voltage corresponding to the speed by means of a counting device. Means are also provided to cause the mechanically actuated means to adjust the position of the throttle to keep the speed of the vehicle at the desired value, and to deactivate the speed control apparatus upon depressing the brake pedal, and to reactivate the speed control apparatus when desired, and also to increase or decrease the desired speed.

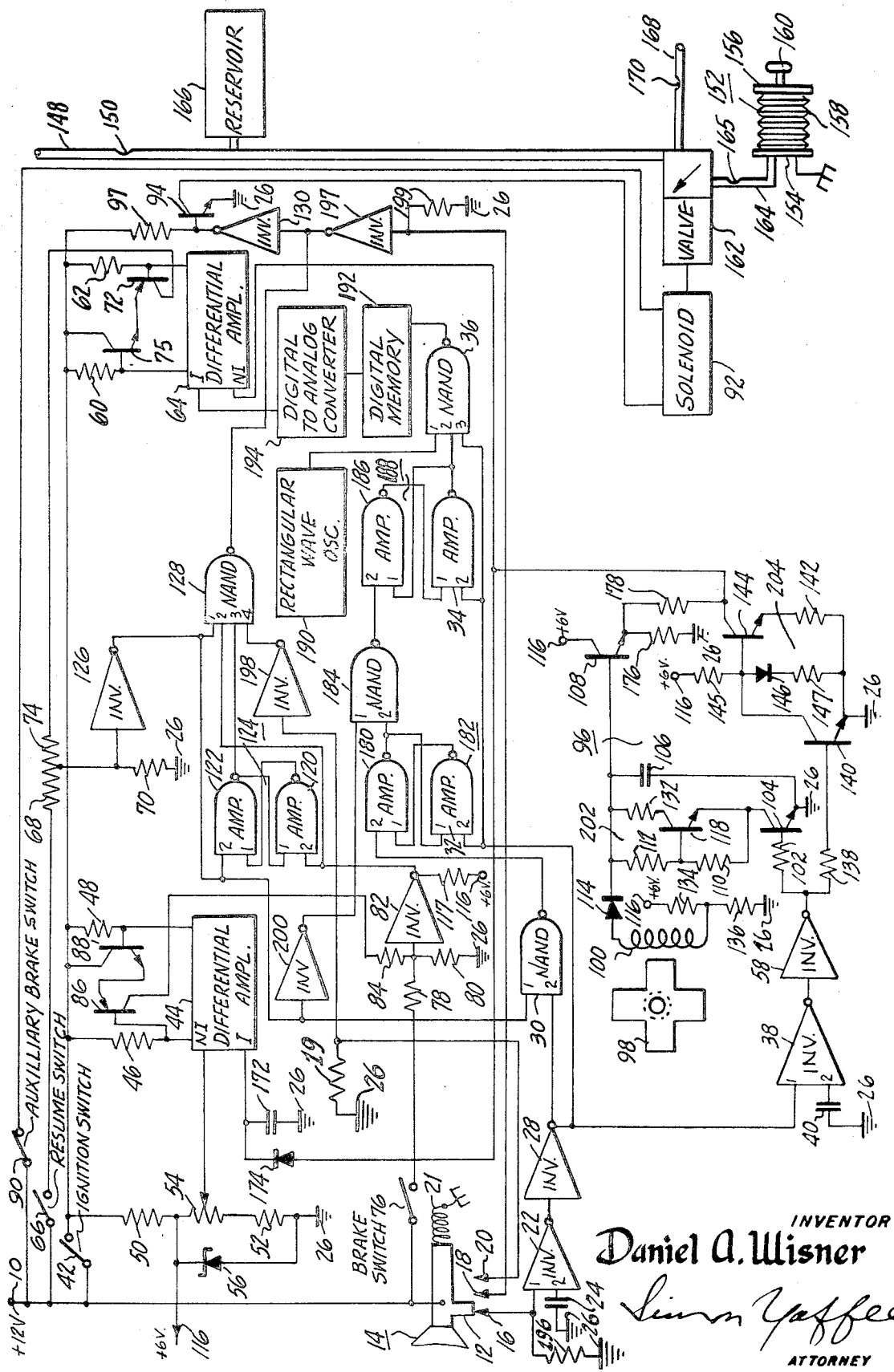

SPEED CONTROL FOR MOTOR VEHICLES

Mechanical speed control mechanisms are known. It is advantageous to provide an electronic speed control apparatus since such an apparatus requires fewer moving parts that may need lubrication, adjustment or repair than the mechanical speed control. Furthermore, an electronic speed control apparatus can also be less expensive to make and can be less bulky than the mechanical speed control devices now known. A known electronic speed control apparatus includes means to provide a voltage which is a measure of the speed of the vehicle, and a capacitive memory or storage means to store a voltage which is a measure of the desired or set speed. It is difficult to maintain the charge on a capacitor which comprises part of a capacitive memory or storage element, for a substantial length of time.

It is an object of this invention to provide an improved electronic speed control apparatus for an automotive vehicle which does not require a capacitive memory.

An electronic arrangement is provided which continuously produces a voltage which is a measure of the speed of the vehicle. Upon attaining a desired speed, a switch is operated to store a voltage corresponding to the desired speed in a memory device of the counter type and to set the apparatus for operation of the vehicle at the desired speed. As the speed of the vehicle varies above or below the desired speed, the stored voltage and the continuously produced voltage are compared. Electronic means controlled by the comparison means are provided to adjust the position of the throttle in such a manner as to keep the speed of the vehicle at the desired set value. Electronic means are also provided to deactivate the speed control means, while continuing to store the voltage corresponding to the previously set desired speed, upon depressing the brake pedal. Electronic means are also provided to reactivate the speed control means to its previously set value when desired, providing the vehicle is traveling above a certain minimum speed, and to increase or decrease the set speed.

The invention will be better understood upon reading the following description in connection with the sole FIGURE of the accompanying drawing which illustrates an apparatus including the inventive device.

The ungrounded terminal 10 of the battery of the automotive vehicle (not shown) with which the to be described speed control apparatus cooperates and on which it is mounted, is connected to a switch 14. The switch 14 may be of the pushbutton type and may be mounted in any convenient position on the car such as on the steering wheel thereof. The switch 14 includes a contact portion 12. A spring 21 biases the switch 14 to its left-hand position as viewed in the FIGURE, at which position the contact portion 12 contacts a contactor 16. This position is known as the "Off or Run" position of the button 14. Upon pushing the switch 14 to the right, the contact portion 12 thereof will be successively in contact with one of the contactors 18 or 20. When the contact portion 12 is in contact with the contactor 18, the switch 14 is in its "Advance" position and when the contact portion 12 is in contact with the contactor 20, the switch 14 is in its "Retard" position.

The contact 16 is connected to the 1 terminal of a delayed inverter 22 having two input terminals 1 and 2. The 2 terminal of the inverter is connected to ground 26 by way of a delay capacitor 24. The output of the inverter 22 is connected to the input of an inverter 28 whose output is connected to the 2 input terminal of a NAND circuit (hereinafter NAND) 30 having two input terminals 1 and 2, to the 2 input terminal of an amplifier 32 having two input terminals 1 and 2, to the 2 input terminal of an amplifier 32 having two input terminals 1 and 2, to the 2 input terminal of an amplifier 34 having input terminals 1 and 2 and to the 3 input terminal of a NAND 36, and also to the 1 input terminal of a second delayed inverter 38 having two input terminals 1 and 2. The 2 input terminal of the delayed inverter 38 is connected to ground 26 by way of a delay capacitor 40.

The output of the inverter 38 is connected by way of an inverter 58 and a resistor 102 to the base of a NPN transistor 104 whose emitter is connected to ground. The emitter of the transistor 104 is also connected through a filter capacitor 106 to the base of a NPN transistor 108. The collector of the transistor 104 is connected by way of two resistors 110 and 112 in series to the cathode of a rectifying diode 114. The collector of the transistor 104 is also connected to the emitter of a NPN transistor 118 whose collector is connected by way of a resistor 132 to the cathode of the diode 114 and also to the base of the transistor 108. The base of the transistor 118 is connected to the junction of the resistors 110 and 112. A positive terminal 116, at which six volts positive appears, which is derived from the battery of the automotive vehicle as will be explained, is connected by way of two resistors 134 and 136 in series to ground 26. The junction of the two resistors 134 and 136 is connected by way of an armature inductor 100 to the anode of the diode 114. A rotatable field structure 98 which cooperates with the armature 100 is rotated at a speed determined by the speed of the vehicle by means not shown.

The output terminal of the inverter 58 is also connected by way of a resistor 138 to the base of a NPN transistor 140 whose emitter is connected to ground. The emitter of the transistor 140 is also connected by way of a resistor 142 to the emitter of a NPN transistor 144. The emitter of the transistor 140 is also connected to the cathode of a diode 146 by way of a resistor 147. The collector of the transistor 140 is connected to the base of the transistor 144 and to the anode of the diode 146. The terminal 116 is connected by way of a resistor 145 to the base of the transistor 144. The emitter of the transistor 108 is connected to ground 26 by way of a resistor 176 and to the collector of the transistor 144 by way of a resistor 178. The collector of the transistor 108 is connected to the terminal 116. The elements 102 to 118, 132 to 147, 176 and 178 comprise a means 96 for producing a road speed voltage which is a measure of the speed of the vehicle on which the described speed control is mounted. The collector of the transistor 144, at which the road speed voltage appears, is connected to the anode of a diode 174 and to the noninverting (hereinafter NI) input terminal of a differential amplifier 64.

The output of the NAND 30 is connected to the 2 input of an amplifier 180 having two input terminals 1 and 2. The output of the amplifier 32 is connected to the 1 input of the amplifier 180 and the output of the amplifier 180 is connected to the 1 input of the amplifier 32, whereby the amplifiers 32 and 180 comprise a bistable flip-flop circuit (hereinafter F-F) 182. The 1 input of the NAND 30 is taken from the output of an inverter 126. The output of the amplifier 180, which is the output of the F-F 182, is connected to the 2 input terminal of a NAND 184 having two input terminals 1 and 2. The output of the NAND 184 is connected to the 2 input of an amplifier 186 having 2 input terminals 1 and 2. The output of the amplifier 186 is connected to the 1 input of the amplifier 34 and the output of the amplifier 34 is connected to the 1 input of the amplifier 186, whereby the amplifiers 34 and 186 comprise a bistable F-F 188. The output of the amplifier 34 which is the output of the F-F 188 is connected to the 2 input of the NAND 36 having 3 input terminals 1, 2 and 3. The output terminal of an oscillator 190, which continuously produces high frequency rectangle waves, is connected to the 1 input terminal of the NAND 36. The output of the NAND 36 is connected to the input of a counter circuit acting as a digital memory 192. The output of the digital memory 192 is connected to the digital-to-analogue converter 194 whose output is connected to the inverting (hereinafter I) input of the differential amplifier 64. As will be explained, when the input terminals 2 and 3 of the NAND 36 are both positive, the pulses produced by the oscillator 190 will be counted by the memory 192. When either or both of the terminals 2 and 3 of the NAND 36 are negative, counting ceases. The memory 192 applies its count to the converter 194 which applies a voltage corresponding to the count to the I input of the differential amplifier 64.

The terminal 10 is also connected by way of a normally open Brake switch 76 and a resistor 78 to the input terminal of an inverter 82. The input of the inverter 82 is also connected to ground 26 by way of a resistor 80, and by way of a resistor 84 to the collector of a transistor 86. As will be pointed out, the collector of the transistor 86 is the amplified output of a differential amplifier 44. The output of the inverter 82 is connected by way of a resistor 117 to the six volts positive terminal 116 and to the 2 input of an amplifier 120 having 2 input terminals 1 and 2. The output of the inverter 82 is also connected to the 2 input of a NAND 128 having 4 input terminals 1, 2, 3 and 4. The output of the amplifier 120 is connected to the 1 input of an amplifier 122 which has 2 input terminals 1 and 2. The output of the amplifier 122 is connected to the 1 input of an amplifier 120 whereby the amplifiers 120 and 122 comprise a bistable F-F 124. The output of the amplifier 122 which is the output of the F-F 124 is connected to the 3 input terminal of the NAND 128. The 2 input of the amplifier 122 is connected to the output of the inverter 126 and to the 1 input terminal of the NAND 128.

The terminal 10 is connected through the Ignition switch 42 of the vehicle, a resistor 50, a potentiometer resistor 54 and a resistor 52 to ground 26. A six volt Zener diode 56 is connected between the junction 116 of the resistor 50 and the potentiometer resistor 54 and ground 26, whereby a steady voltage at the breakdown value of the Zener diode 56 appears across the potentiometer 54 and the resistor 52 in series even though the voltage at the terminal 10 may vary during starting, idling, and driving of the vehicle which includes the battery whose positive terminal is connected to the terminal 10. The junction 116 may be used as a source of six volts positive with respect to ground where needed in the circuit as described and to be described. The slider on the potentiometer 54 is connected to the NI terminal of the differential amplifier 44. The I input terminal of the differential amplifier 44 is connected to ground 26 through a filter capacitor 172 and to the cathode of the diode 174.

The terminal 10 is also connected through the Ignition switch 42 and respective resistors 46 and 48 to the two output terminals of the differential amplifier 44, and through the switch 42 and respective resistors 60 and 62 to the two output terminals of the differential amplifier 64, and through the switch 46 and a resistor 97 to the base of a transistor 94.

The base of a NPN transistor 88 is connected to the junction of a resistor 48 and an output terminal of the differential amplifier 44. The collector of the transistor 88 is connected directly to the switch 42. The emitter of the transistor 88 is connected to the emitter of a PNP transistor 86 whose base is connected to the junction of the resistor 46 and the output terminal of the differential amplifier 44. The transistors 86 and 88 act to amplify the output of the differential amplifier 44, the collector of the transistor 86 being the output terminal at which the amplified output of the differential amplifier 44 appears.

The base of a NPN transistor 75 is connected to the junction of the resistor 60 and the output terminal of the differential amplifier 64. The collector of the transistor 75 is connected to the switch 42. The emitter of the transistor 75 is connected to the emitter of a PNP transistor 72 whose base is connected to the junction of the resistor 62 and an output terminal of the differential amplifier 64. Amplified output of the differential amplifier 64 appears at the collector of the transistor 72. The collector of the transistor 72 is connected by way of a resistor 74 to the input terminal of the inverter 126. The input of the inverter 126 is also connected to ground 26 by way of a resistor 70.

The terminal 10 is connected by way of a Resume switch 66 and a resistor 68 to the input terminal of the inverter 126.

The terminal 10 is also connected by way of a normally closed Auxiliary Brake switch 90 to one terminal of a solenoid 92 whose other terminal is connected to the collector of the transistor 94. The emitter of the transistor 94 is connected to ground 26. The output of the NAND 128 is connected by way of an invertor 130 to the base of the transistor 94.

The contact 18 of the switch 14 is connected by way of a resistor 199 to ground 26 and to the input of an inverter 197 whose output is connected to the input of the inverter 130.

The contact 20 of the switch 14 is connected to ground 26 by way of the resistor 19 and by way of an inverter 198 to the 4 input terminal of the NAND 128. The output terminal of the inverter 126 is connected to the input of an inverter 200 whose output is connected to the 1 input terminal of the NAND 184.

A suction or vacuum tube 148 is connected to the intake manifold of the engine (not shown) of the vehicle whereby a suction or vacuum appears in the tube 148 when the engine is operating. A restriction 150 is provided in the tube 148, this restriction 150 acting as a resistance to the flow of air to the tube 148. The vacuum tube 148 extends through the restriction 150 to a reservoir 166 and also to a valve 162 which is actuated by the solenoid 92. A tube 168 having a restriction 170 extends from the valve 162 to the open air. A tube 164 having a restriction 165 therein extends from the valve 162 to a bellows 152. The bellows 152 has a relatively fixed wall 154 and a moveable wall 156 joined thereto by a flexible wall 158 which resiliently tends to remain extended. The moveable wall 156 is mechanically fixed to a shaft 160 which operates the throttle of the vehicle. When the bellows 152 is collapsed by the suction applied thereto, the throttle is opened to the maximum extent. When the solenoid 92 is energized, the valve 162 connects the bellows 152 to the vacuum tube 148 and maximum suction is applied to open the throttle. When the solenoid 92 is deenergized, the valve 162 connects the bellows 152 to the open air by way of the tube 168. The restriction 165 in the tube 164 acts as a cushion means to cushion the action of the valve 162, whereby the throttle is moved more slowly as the valve 162 changes the connection of the bellows 152 between the vacuum tube 148 and the open air then if restriction 165 were not used.

The differential amplifiers 44 and 64 each have two 180° out-of-phase input terminals, one, as noted above, being called the inverting or I input terminal and the other being called the noninverting or NI terminal. The differential amplifiers 44 and 64 also each have two 180° out-of-phase output terminals. However, the outputs at the two output terminals of each amplifier 44 and 64 are combined whereby only one output appears for each amplifier 44 and 64 as noted above. The F-F 124, 182 and 188 each have two conditions of stability. Considering the F-F 124 as an example, one condition of stability exists when the amplifying element (not shown) in the amplifier 122 is conductive and the amplifying element (not shown) contained in the amplifier 120 is not conductive, and the other when the states of conductivity of these amplifying elements are reversed. Furthermore, a low potential (hereinafter low or negative) on the 2 input terminal of the amplifier 120 puts the F-F circuit 124 into its deactivate state whereby the output of the amplifier 122 is low in voltage and the output of the amplifier 120 is high in voltage. A low potential at the 2 input of the amplifier 122 puts the F-F circuit 124 into its activate state, whereby the output of the amplifier 122 is a high potential (hereinafter high or positive) and the output of the amplifier 120 is low. A high on the 2 input of either or both amplifier 120 or 122 does not change the state of the F-F 124. However, a high on the 2 input of either amplifier 120 or 122 does not prevent change of state by a low on the 2 input of the other of these two amplifiers. If lows are applied simultaneously to the two inputs of both amplifiers 120 and 122, output of both amplifiers 120 and 122 goes high. When one of the two lows ends leaving one low, the output of the amplifier 120 or 122 from whose input the low has disappear, goes low. The F-F's 182 and 184 operate similarly. The several inverters 28, 58, 82, 126, 130, 197, 198, and 200 merely invert the voltages applied to the input terminals thereof. That is, if a low voltage is applied to the input terminal of an inverter, a high voltage appears at the output terminal thereof and vice versa. The inverters 22 and 38 not only invert the voltage applied thereto but they also delay the applied signal for a short period of time due to the action of the capacitors connected to their 2 input terminals. Each of the NANDS 30, 36, 128, and 184, upon application of a high voltage to all input terminals thereof exhibits a low voltage at the output terminal thereof, and otherwise the NANDS exhibit high voltages at the output terminals thereof. When the solenoid 92 is not energized, the valve 162 is connected to open air by way of the tube 168 and no suction is applied to the bellows 152 whereby the only control applied to the throttle of the vehicle is by the accelerator pedal (not shown) thereof. The digital memory 192 counts down from whatever number was last stored therein to zero, then jumps to its maximum and counts down again as long as pulses are applied thereto.

The described speed control is turned on by closing the Ignition switch 42 whereby operating current is applied to the several described elements. The Zener diode 56 breaks down and a constant voltage appears at the junction 116 and across the potentiometer 54 and the resistor 52 in series. A desired portion of this voltage is chosen by manipulating the slider of the potentiometer 54, this desired portion representing a minimum speed (such as 30 miles an hour) below which the described speed control should not operate. Since at standstill of the car, no voltage is applied to the 1 input of the differential amplifier 44 by the speed sensing apparatus 96, a positive or high voltage is applied to the input of the inverter 82 from the output of the differential amplifier 44. The output voltage of the inverter 82 is low. Since the output of the inverter 82 is applied to the 2 input of the NAND circuit 128, the output thereof is high. Low voltage is therefore applied to the base of the transistor 94, which renders it nonconductive whereby the solenoid 92 is not energized, and the valve 162 is connected to open air, and no suction is applied to the bellows 154, whereby the described speed control apparatus has no effect on the car throttle as long as the voltage at the output of the inverter 82 is low. Under these conditions the speed of the car is controlled solely by the driver as he moves the position of the accelerator pedal. As pointed out, the potential at the output of the inverter 82 will be low as long as the speed of the car is below the desired minimum speed.

Since low voltage is applied to the 2 input of the amplifier 120, the F-F 124 will be in its deactivate condition, whereby the output of the amplifier 122 is low, as long as the output of the inverter 82 is low and a low is applied to the 3 input of the NAND 128. Since the car is stationary and nothing is yet stored in the memory 192, (whereby no voltage is yet applied to the 1 input of the differential amplifier 64 by the digital-to-analogue converter 194), the output of the inverter 126 is high, and the 1 input of the NAND circuit 128 is also high. As long as any one or more input of the NAND 128 is low, the described speed control cannot control the speed of the vehicle. At this time, the button 14 is in its Off or Run position, which is the furthest to the left as viewed in the FIGURE. After a moment of delay caused by the capacitor 24, a high voltage is applied to the input of the inverter 22 whereby a high is applied to the 2 input of the NAND 30, applying a low to the 2 input of the amplifier 180, (the 1 input of the NAND 30 being high). The output of the amplifier 180 is high and the 2 input of the NAND 184 is high. A high is applied to the 2 input of the amplifier 32, which as stated above, has no effect on the F-F 182. A high is applied to the 2 input of the amplifier 34, having no effect on the F-F 183 and a high is applied to the 3 input of the NAND 36. Since the output of the inverter 126 is high, a low is applied to the 1 input of the NAND 184, whereby the output thereof is high and applies a high to the 2 input of the amplifier 136.

After a further moment of delay, caused by the capacitor 40, a high is applied to the base of both of the transistors 104 and 140 making them conductive. Since the car is at a standstill, the rotor 98 is stationary and no voltage is induced in the inductor 100. The positive voltage at the junction of the resistors 130 and 134 is applied as a forward bias on the rectifier diode 114 whereby the diode 114 is always positively biased.

The resistors 112, 110 and 132 and the transistor 118 collectively act as a voltage variable resistor 202 whose resistance is inversely proportional to the voltage applied across the resistors 110 and 112. That is, when the transistor 118 is not conductive, the resistance of the resistor 202 is equal to the resistance of the resistors 110 and 112 in series. However, as the voltage on the cathode of the diode 114 goes up (when the car is running), the bias at the base of the transistor 118 builds up and the transistor 118 becomes more conductive decreasing the resistance of the voltage variable resistor 202. The voltage variable resistor 202 and the capacitor 106 in parallel comprise a time constant circuit during the time when the transistor 104 is conductive. When the transistor 104 is not conductive, the voltage variable resistor 202 is open circuited, and the voltage variable resistor 202 has no effect on the speed control apparatus. The purpose of the time constant circuit comprising the voltage variable resistor 202 and the capacitor 106 is to keep constant the amplitude of the ripples on the positive voltage provided by the rotor 98 (when rotating) and appearing at the cathode of the rectifier 114. As is pointed out hereinafter, it is important for smooth operation of the vehicle for the ripple to be of constant amplitude regardless of the speed of the vehicle. However, as is known, as the rotor 98 speeds up from zero (as the car begins to move and speeds up) the higher the frequency of the voltage applied to the anode of the diode 14, the higher the direct voltage appearing at the cathode of the diode 114. Also, at these higher frequencies, the amplitude of the ripple of the voltage on the cathode of the diode 114 becomes less. When the transistor 104 is conductive, the voltage variable resistor 202 and the capacitor 106 cause the amplitude of the ripple voltage at the base of the transistor 108 to remain constant even though the frequency and the amplitude of the voltage wave applied to the base of the transistor 108 increases with the speed of operation of the vehicle. When the transistor 104 is not conductive, then, due to the storage action of the capacitor 106, the voltage at the base of the transistor 108 builds up to the peak of the ripple voltage appearing at the cathode of the diode 114, that is, no ripple voltage is applied to the base of the transistor 108 when the transistor 104 is not conductive.

The elements 142, 144, 145, 146 and 147 act as a constant current device 204 tending to drain to ground a constant current through the resistor 178. The constant current device 204 is chosen so that the constant current that it drains in amperes times the resistance of the resistor 178 in ohms is equal to a voltage which is one half of the voltage swing of the ripple voltage appearing at the emitter of the transistor 108. When the transistor 140 is conductive, no base current is applied to the base of the transistor 144, whereby it is not conductive. No current is then drawn by the constant current device 204 and the voltage at the collector of the transistor 144 is the same as the voltage at the emitter of the transistor 108. However, when the transistor 140 is not conductive, the current flowing through the transistor 144 and the resistor 142 in series to ground is constant and is such that the voltage at the collector of the transistor 144 is less than the voltage at the emitter of the transistor 108 by one half the ripple voltage, whereby the voltage at the collector of the transistor 144 is a steady voltage equal to the average of the ripple voltage that would be produced if the transistor 140 were conductive. That is, the steady voltage on the collector of the transistor 144 when both of the transistors 104 and 140 are not conductive is equal to the average of the ripple voltage appearing on the collector of the transistor 144 when the transistors 104 and 140 are both conductive. This is necessary to prevent the memory circuit 192 from storing a value related to a portion of the ripple wave rather than a voltage related to the speed of the vehicle. It is therefore noted that (in its steady state) when the button 14 is in its Off or Run position (all the way out or to the left) no matter whether the car is moving or stationary, both transistors 104 and 140 are conductive and the ripple increasing circuit 202 is operative, while the constant current circuit 204 is inoperative. However, if the car is stationary, no voltage is induced in the inductor 100. In any other position of the switch 14 (after delays as explained), the ripple increasing circuit 202 is inoperative and the constant current device 204 is operative.

Let it be assumed that the button 14 remains in its out or Off or Run position and that the vehicle speeds up whereby an increasing voltage having a constant amplitude ripple thereon appears at the anode of the diode 174 and at the NI terminal of the differential amplifier 64. Due to the action of the diode 174 and the capacitor 172, the voltage applied to the I input of the differential amplifier 44 has no ripple thereon. However, as long as the voltage at the I input of the differential amplifier 44 is less than the voltage applied to the NI input thereof due to the position of the slider on the potentiometer 54, the output of the differential amplifier 44 is positive and a negative is applied to the 2 input of the NAND 128 whereby the base of the transistor 94 is low or negative and the bellows 152 has no suction applied thereto, whereby the bellows 152 in no way effects the position of the throttle of the vehicle. That is, the below a minimum speed corresponding to the voltage set into the system by adjustment of the slider on the potentiometer 54, the described speed control cannot effect the speed of the car.

Since there is no voltage applied to the I input of the differential amplifier 64, the output of the differential amplifier 64 (due to the input at the NI terminal thereof from the car road speed voltage device 96) is positive. (Also whenever the voltage is applied to the I input of the differential amplifier 64 is lower than the voltage applied to its NI input, the output of the differential amplifier 64 is positive). The output of the inverter 126 is negative or low and the 1 input of the NAND 128 is low. Also a low is applied to the 2 input of the amplifier 122 whereby the F-F 124 applies a high to the 3 input of the NAND 128. When the output of the inverter 126 is low, the inverter 200 applies a high to the 1 input of the NAND 184. Also a low is applied to the 1 input of the NAND 30 whereby the output thereof is high, having no effect on the F-F 182.

Now let it be assumed that the car has speeded up until the voltage at the I input of the differential amplifier 44 is greater than the voltage at the NI input thereof. The output of the differential amplifier 44 goes low and the output of the inverter 82 goes high and the 2 input of the amplifier 120 goes high (having no effect on the F-F 124) and the 2 input of the NAND 128 goes high. However, since the 1 input of the NAND 128 is low, there is no effect on the throttle of the car.

Now let it be assumed that the car is going faster than the minimum speed as set by the slider of the potentiometer 54 and the button 14 is moved to its intermediate or Advance position. A positive is immediately put on the base of the transistor 94 by way of the two inverters 197 and 130, energizing the solenoid 92 and causing the bellows 152 to contract and the car immediately begins to accelerate and continues to accelerate as long as the button 14 is held in its Advance position. For a moment, due to the operation of the capacitor 24, the output of the inverter 22 stays low and for an additional moment, due to the action of the capacitor 40, the input to the base of the transistors 104 and 140 stay high. During the first moment, a high continues to be applied to the 2 input of the NAND 30, however a low is applied to the 1 input of the NAND 30 since the output of the inverter 126 is low, whereby the output of the NAND 30 is high, causing no change of the F-F 182. During this first moment, the 2 input of the amplifiers 32 and 34 remain high causing no change of the F-F's 182 and 188. A high is applied to the 1 input of the NAND 184. Since a low is applied to the 2 input of the NAND 184, a high is applied to the 2 input of the amplifier 186, having no effect of the F-F 188 whereby a low continues to be applied to the 2 input of the NAND 36. During this first moment, the high remains on the 3 input of the NAND 36, however, the pulses applied to the 1 input of the NAND 36 are not counted by the digital memory 192 since the 2 terminal of the NAND 36 is low. At the end of the first moment, the 2 input of the NAND 30 goes low, whereby the output thereof is high. Also the 2 inputs of the amplifiers 32 and 34 go low whereby the output of the F-F 182 is low and the output of the F-F 188 is high. However, since the 3 input of the NAND 36 is low, no counting takes place. At the end of the additional moment, the transistors 104 and 140 become conductive and the voltage at the collector of the transistor 144 becomes a rippleless road speed direct voltage which is equal in value to the average of the ripple voltage that would have been produced if the transistors 104 and 140 were nonconductive.

After the speed of the vehicle is reached at which the operator wants the vehicle to run, the operator lets go the button 14 and the spring 21 causes the button 14 to snap back to its Off or Run position. After a first moment of delay, which is caused by the capacitor 24, the 2 input of the NAND 30 goes high but since the 1 input of the NAND 30 is low, the output thereof remains high. The 2 inputs of the amplifiers 32 and 34 go high causing no change, and the 3 input of the NAND 36 goes high. Since both inputs 2 and 3 of the NAND 36 goes high. Since both inputs 2 and 3 of the NAND 36 are high, the NAND 36 passes the positive portions of the oscillations applied to its 1 input by the oscillator 190, and the digital memory 192 counts down from a maximum value. The digital-to-analogue converter 194 applies a voltage to he the I input of the differential amplifier 64 which corresponds to the count, this voltage starting at its highest value and going down as the memory circuit 192 counts down. This counting takes place during the second moment, while the output of the road speed voltage circuit 96 is still producing its rippleless average voltage. During the time that the voltage applied by the digital-to-analogue converter 194 to the I input of the differential amplifier 64 is higher than the road speed voltage applied to the NI input of the differential amplifier 64, the output of the inverter 126 is positive. During the second moment, due to this count down, the voltage at the I input of the differential amplifier 64 becomes equal or becomes very slightly less than the voltage applied to the NI input thereof and the output of the inverter 126 goes low, whereby a high is applied to the 1 input of the NAND 184. Since the 2 input of the NAND 184 is high, as pointed out above, a low is applied to the 2 input of the amplifier 186 and the F-F 188 applies a low to the 2 input of the NAND 36, and the digital memory 192 stops counting. Also, the output of the NAND 30, which was low when the output of the inverter 126 was high, becomes high, having no effect on the F-F 182. All this happens in the second moment mentioned above. Then, after the second moment, the transistors 104 and 140 become conductive and the road speed voltage at the collector of the transistor 144 becomes ripple again.

The operation of the speed control apparatus is explained above on the supposition that nothing was stored in the digital memory 192. It is more likely however that a number is stored in the digital memory 192 whereby a voltage is applied to the I input of the differential amplifier 64. If this voltage is lower than the running speed voltage of the car at the time the button 14 is moved to its Advance position, the output of the inverter 126 is low, as stated hereinabove, and the operation is as explained hereinabove. If the voltage applied to the I input of the differential amplifier 64 is higher than the road speed voltage at the moment that the button is moved to its Advance position, the output of the inverter 126 is positive. During the first moment of delay caused by the capacitor 24 after the button 14 is pressed to the Advance position, both inputs to the NAND 30 are high whereby the output thereof is low and a low is applied to the 2 input of the amplifier 180 causing the output of the F-F 182 to be high. However, since the output of the inverter 200 is low, whereby the 2 input of the NAND 184 is low, the output of the NAND 184 is high, having no effect on the F-F 180. At the end of the first moment after the button 14 is pressed, the output of the NAND 30 goes high having no effect on the F-F 182. The 2 input of the amplifier 32 goes low, causing the output of the F-F 182 to go low. The 2 input of the amplifier 34 goes low, whereby the output of the F-F 188 goes high. Since the 3 input of the NAND is now low, no counting takes place. During the second moment after the button 14 is pressed, the changes in operation of the road speed circuit 96 takes place as noted above. To set a new speed into the speed control apparatus, the operator may hold the button 14 in its Advance position until the vehicle attains the desired speed. After the button 14 is released while the vehicle is running at a speed less than the speed for which the speed control apparatus was previously set, the output of the inverter 126 is high. During the first moment after the button 14 is released (due to the action of the capacitor 26) the 2 input of the NAND 30 is low whereby the NAND 30 has no effect on the circuit. Since the output of the inverter 126 is high, the 1 input of the NAND 184 is low, whereby the NAND 184 has no effect on the circuit. The output of the F-F 182 is low and the output of the NAND 184 is high and the 2 input of the NAND 36 is high. However, during this first moment after release, the 3 input to the NAND 36 is low and no counting takes place. At the end of the first moment, the 3 input to the NAND 36 goes high and the digital memory starts counting down. Also at the end of the first moment after release of the button 14, the produced road speed voltage is rippleless. During the second moment, the output of the inverter 126 is positive and both inputs to the NAND 30 are high, whereby the output of the F-F 182 and the 2 input of the NAND 184 become high, however the 1 input of the NAND 184 is low due to the action of the inverter 200 so there is no effect on the F-F 186 and the counting down to zero and snapping back up to its maximum continues. As soon as the voltage on the two inputs of the differential amplifier 64 become equal, the output of the inverter 126 goes low and the 1 input of the NAND 184 goes high (the 2 input thereof remaining high) and the output of the F-F 188 and of the 2 input of the NAND 30 go low and the counting stops. All this takes place during the second moment after release of the button 14, at the end of which the road speed circuit 96 again produces a ripple voltage wave. Therefore, pushing the button 14 into its Advance position and letting it go at a new desired road speed causes setting into the memory 192 a number corresponding to the new road speed whether the old road speed that had been set into the memory 192 were higher or lower than the new road speed.

If the operator of the car does not touch his brake or accelerator pedal, the car will continue to run at the set speed at which it was going when the button switch 14 was released. This is accomplished as follows: It is assumed that the set speed is higher than the minimum speed determined by the setting of the slider of the potentiometer 54. Otherwise, as pointed out above, the described speed control circuit cannot operate. The voltage applied to the I terminal of the differential amplifier 64 is a constant voltage depending on the last count made by the memory 192. The voltage at the NI terminal of the differential amplifier 64 is a ripple voltage whose average amplitude depends on the speed of the car. Let it be assumed that the highest peak of the road speed voltage applied to the NI terminal of the differential amplifier 64 is below the voltage applied to the I terminal thereof. Then the output of the differential amplifier 64 is low and the output of the inverter 126 is high whereby high is applied to the 1 input of the NAND 128. High is applied to the 2 input of the NAND 128 since the speed of the car is above the minimum mentioned above, causing the output of the differential amplifier 44 to be low whereby the output of the inverter 82 is high. The flip-flop 124 is in its activate state (since it had been put in this state by the output of the inverter 126 when it was low) whereby the 3 input terminal of the NAND 128 is high, and the input to the inverter 198 is low (since the contact 20 is off of the switch portion 12 of the switch 14) whereby the 4 input of the NAND 128 is high. All 4 inputs to the NAND 128 being high, the input at the base of the transistor 94 is high and the solenoid 92 is energized to cause contraction of the bellows 152, which opens the throttle and speeds up the car.

Now let it be assumed that the speed of the car is so high that no part of the ripple road speed voltage is below the stored voltage. Then the output of the inverter 126 is low and the 1 input of the NAND 128 is low and the base of the transistor 94 is low and the solenoid 92 is deenergized, whereby the bellows 152 expands and the throttle is allowed to close, permitting the car to slow down.

Now let it be assumed that the speed of the car is such that the steady voltage applied to the I input of the differential amplifier is between the peak and the trough of the road speed voltage applied to the NI input terminal of the differential amplifier. Then the solenoid 92 is energized and deenergized at the frequency depending on the frequency of the ripple, opening and closing the valve 162, applying and not applying suction to the bellows 152, at a duty cycle such that the bellows 152 takes a condition of expansion suitable to keep the car running at a constant speed. During the time that the road speed voltage is not equal to the memory voltage, the throttle is moved gradually more open or more closed depending on the power necessary to keep the car running at the set or chosen speed of the vehicle, and the vehicle runs smoothly at the set speed.

If the button 14 is pushed all the way in to the Retard position, a negative is applied to the 3 input of the NAND 128 by the inverter 198 whereby the solenoid 92 is deenergized and the throttle closes. When the car has slowed down to the speed at which the oscillator wishes the car to continue, the operator releases the button 14 and the spring 21 snaps the button 14 back through Advance to Run or Off position. As pointed out above, a new voltage, equal to the road speed during the second of the two moments mentioned above, is set into the memory 192 after the button 14 has arrived at its Off or Run position.

Let it be assumed that the brake (not shown) is depressed momentarily. Then the Brake switch 76 is closed and the auxiliary brake switch 90 is opened. Opening the switch 90 opens the circuit for the solenoid 92. Closing the switch 76 puts a low on the 2 input of the NAND 128 whereby the transistor 94 is blocked. Therefore depressing the brake opens both connections to the solenoid 92 and the bellows expands and the throttle is controlled only by the foot of the driver. At the same time, a negative is applied to the 2 input of the amplifier 120 whereby the output of the F-F 124 goes low, that is, the F-F 124 is put into its deactivate state and the 3 input of the NAND 128 goes low. Therefore, momentary closing of the switch 76 prevents operation of the described speed control until the F-F 124 is put back into its activate state and the car speed is controlled solely by the operator. The F-F 124 can be put into its activate state by momentarily closing the Resume switch 66 to put a negative on the 2 input of the amplifier 122 by way of the inverter 126. Then, as soon as the switch 66 is released, all four inputs to the NAND 28 become positive to cause the speed control circuit to speed up the car to the speed that had been set into the memory 192 just before the brake was depressed. The 1 input of the NAND 128 is positive since the car is going below the speed set into the memory 192. The 2 input is positive since the car is going higher than the minimum speed as determined by the slider of the potentiometer 54, the 3 input is positive since the F-F is now in its activate state and the 4 input is positive since the contact 20 is at low potential. Alternatively, the previously set speed can be resumed by speeding up the car as by foot operation of the accelerator. When the road speed gets up above the set speed, the output of the inverter 126 will become negative activating the F-F 124 and making the 3 input of the NAND 128 high. Then if the foot is taken off of the accelerator, the 1 input of the NAND 128 becomes high when the car slows down to the set speed. The 2 and 4 inputs are high since the road speed is over the minimum and since the button 14 is in its Run or Off position. Obviously, if desired, a new speed can be set into the speed control apparatus by manipulation of the button 14.

It will be noted that this speed control apparatus has the following features.

1. A minimum speed below which the speed control apparatus cannot operate may be set into the apparatus.
2. The speed control can be set to maintain the car speed at any speed at which the car is operating.
3. Depressing the brake disables the throttle control as long as the brake is held down.

4. Depressing the brake deactivates the speed control apparatus even after the brake is released and until the speed control apparatus is reactivated.

5. The operator may advance the set speed by pushing a button to an Advance position which causes the speed of the car to increase. The button is released when the desired speed is attained.

6. The operator may decrease the set speed by pushing the same button to a Retard position which causes the speed of the car to decrease. Again the button is released when the desired speed is attained.

7. After braking the car speed, the set speed may be resumed by pressing a Resume button.

8. After braking the car speed, the set speed may be resumed automatically by merely speeding up the car to the previously set speed.

9. After braking the car, the speed control may be set for a higher or a lower speed by pressing the button to the Advance or the Retard position and releasing the button.

10. Safety means are provided to insure disablement of the speed control while the brake is on.

11. Manipulation of only one button provides Run, Advance and Retard control of the speed control apparatus.

12. Since the speed control apparatus draws very little current (in the order of one tenth of an ampere), the speed control apparatus may be energized by turning on the Ignition switch and may be kept on continuously while the car is operating without danger of discharging the car battery.

13. An electronic counter is used to store information concerning set car speed whereby no provision need be made for compensating for leakage of a memory or storage capacitor, and 14. For the most part, the described circuit is particularly adapted to be constructed of integrated circuits.

I claim:

1. An electronic speed control for automotive vehicles comprising:
means to produce pulses;
means to count said pulses, said means counting down from a maximum number;
means to produce a voltage which is a measure of the number of pulses counted;
means to produce a voltage which is a measure of the road speed of the vehicle;
means for stopping the counting of said pulses when said voltages are equal; and
means for operating the throttle of said vehicle in a manner to keep said voltages equal.

2. An electronic speed control for automotive vehicles, comprising:
means to produce pulses;
means to produce pulses;
means to produce a first voltage which is a measure of the number of pulses counted;
means to produce a second voltage which is a measure of the road speed of the vehicle, said second voltage having ripple, said ripple normally increasing in frequency and decreasing in amplitude as the speed of the vehicle increases;
means for keeping the amplitude of said ripple constant although the speed of said vehicle varies;
means for stopping the counting of said pulses when the average value of said second voltage is equal to the value of said first voltage; and
means for operating the throttle of said vehicle in a manner to keep said first and second voltages equal.

3. The invention as expressed in claim 2, in which means are provided to inactivate said means for keeping the amplitude of said ripple constant when said pulses are being counted.

4. The invention as expressed in claim 3 in which means are provided to subtract a voltage substantially equal to one half of said ripple voltage from said voltage which is produced when said means for keeping the amplitude of said ripple constant in inactivated.

UNITED STATES PATENT OFFICE
CERTIFICATE OF CORRECTION

Patent No. 3,570,622　　　　　　　　Dated　March 16, 1971

Inventor(s) Daniel A. Wisner

It is certified that error appears in the above-identified patent and that said Letters Patent are hereby corrected as shown below:

Column 12, line 15　　　　"means to produce pulses" should be --means to count pulses--

Signed and sealed this 11th day of April 1972.

(SEAL)
Attest:

EDWARD M. FLETCHER, JR.　　　　ROBERT GOTTSCHALK
Attesting Officer　　　　　　　　Commissioner of Patents